April 18, 1933.    C. G. WATSON    1,904,757
SALT AND PEPPER SHAKER
Filed March 7, 1932

INVENTOR.
Claude G. Watson.

Patented Apr. 18, 1933

1,904,757

UNITED STATES PATENT OFFICE

CLAUDE G. WATSON, OF PASADENA, CALIFORNIA, ASSIGNOR OF ONE-HALF TO JOHN BYERS AND GEORGE D. GOTTSCHICK, BOTH OF PASADENA, CALIFORNIA

SALT AND PEPPER SHAKER

Application filed March 7, 1932. Serial No. 597,307.

This invention relates to an improved device to hold salt and pepper, or other like granular or powdered material, and deliver the contents in small quantities as may be required. The invention also contemplates the provision for a device of the character wherein material, such as salt, pepper and the like, may be separately contained within and separately dispensed from the same container in a convenient and efficient manner.

A further object of this invention is to provide means whereby the receptacle is closed at all times except when it is desired to dispense the contents therefrom selectively. A further object is to provide means to prevent mixing of the contents of the various compartments.

A further object within the contemplation of the invention is to provide means whereby all cooperating parts may be held in alignment, accurately positioned and disposed relative to each other. It is also an object of this invention to provide a salt and pepper container and sprinkler of the type described of generally improved construction, whereby the device will be simple, durable and inexpensive in construction, as well as practical and serviceable in its use.

Figure 1:
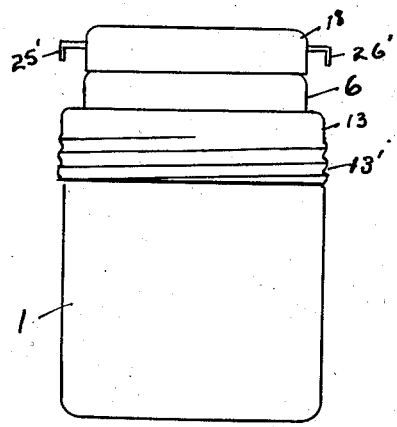
Figure 3:
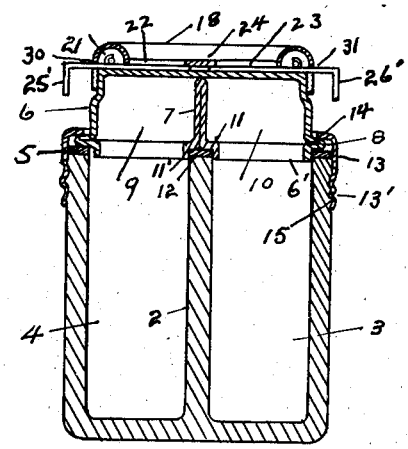
Figure 5:
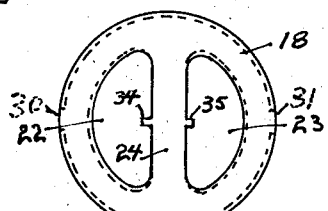
Figure 2:
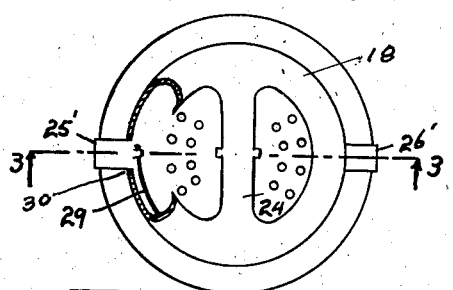
Figure 6:
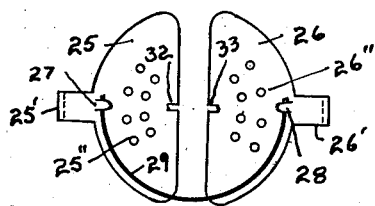
Figure 4:
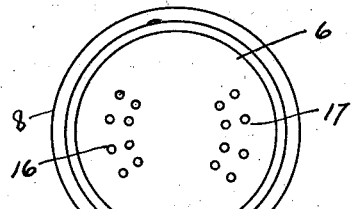
Figure 7:
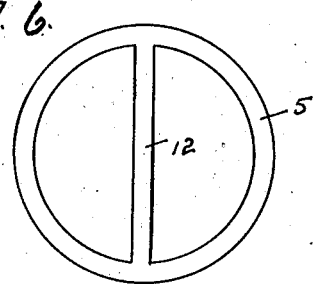

Further objects and advantages will become more apparent from the following specifications when considered in connection with the accompanying drawing, in which:

Fig. 1 is an elevation of the complete device,

Fig. 2 is a plan of the device with a portion cut away to disclose the relative disposition of parts, Fig. 3 is a section on the line 3—3 of Fig. 2, showing the parts in section, Fig. 4 is a plan of the enclosing cover showing the disposition of the perforations, Fig. 5 is a plan of the cap piece, Fig. 6 is a plan of the shutters removed from the receptacle and placed in relative operable position, with the spring in place, and showing more clearly the details of construction, and Fig. 7 is a plan of the packing ring.

Referring to the drawing with more particularity, the receptacle 1, which is preferably of glass, has a central partition 2 which provides two compartments, 3 and 4. The upper edge of the partition 2 is preferably flush with the upper edge of the receptacle 1, to provide a continuous surface upon which the packing ring 5 may rest and cover the upper faces of the edges of the receptacle and partition and provide a means to prevent the contents of either compartment from leaving the compartment. An enclosing cover 6 having a central partition 7 is so constructed as to provide an outwardly projecting annular flange 8 which conforms to the shape of the upper edge of the receptacle 1, and when in position rests upon the packing ring 5, and encloses the packing ring 5 between the projecting flange 8 and the upper edge of the receptacle. The central partition 7 is so constructed as to provide two chambers 9 and 10 in the enclosing cover and has a flanged portion 11 which, when assembled, rests upon the mid web 12 of the packing ring 5 and secures it against the upper edge of the partition 2 of the receptacle 1. To more securely retain the packing ring 5 in position, I provide a downwardly extending rim 6' of the enclosing cover 6, and turn the flanged portion 11 downwardly forming a downwardly extending flange 11'. To secure the enclosing cover 6 and packing ring 5 upon the receptacle, I provide a clamping ring 13 which has an inturned annular flange 14 extending over and engaging the projecting flange 8 of the enclosing cover. The clamping ring 13 is threaded with threads 13' to conform to and engage the threads 15 formed about the upper end of the receptacle 1, thus providing a means for securing the enclosing cover 6 and packing ring 5 to the receptacle.

The enclosing cover 6 is perforated with holes 16, preferably large, for salt, and 17, preferably smaller, for pepper. The two groups of perforations are disposed in opposite segments of the circular top of the enclosing cover, corresponding in relative position to the two compartments 9 and 10. A cap 18 is formed to fit over the enclosing cover 6 and is held in place in any suitable manner, as by slight indentations 19 and corresponding slight projections 20 on the enclosing cover 6. The head of the cap 18 is depressed centrally to form an annular channel 21, and is perforated by two oppositely disposed openings 22 and 23, leaving a mid web 24. When the cap 18 is in position upon the enclosing cover 6 the openings 22 and 23 are adjacent the areas of the perforations 16 and 17 of the enclosing cover 6 so that the perforations 16 are within the opening 22 and the perforations 17 are within the opening 23 and the mid web 24 is aligned with the partition 7.

The shutters 25 and 26 consist each of an approximately segment-shaped flat piece with extension arms 25' and 26', and within their respective flat areas have perforations indicated respectively as 25'' and 26'' which register with the perforations 16 and 17 of the enclosing cover 6 when the shutters are in assembled position. The shutters are shown in their relative positions in Fig. 6. On the shutter 25 is a pressed up lip 27 and a similar pressed up lip 28 on the shutter 26. The extremities of an approximately U-shaped spring 29 are engaged with the lips 27 and 28 in a manner whereby an inward movement of either shutter is against the outward urge of the spring 29. When assembled in operable relation, as in Fig. 3, the shutters rest upon the enclosing cover 6 and are held down upon it by the cap 18. Thus positioned the series of perforations 25'' in the shutter 25 register with the perforations 16 of the enclosing cover 6 which perforations communicate with the chamber 9 of the enclosing cap and with the compartment 4 of the receptacle 1. Likewise the perforations 26'' in the shutter 26 register with the perforations 17 in the enclosing cover 6, which perforations communicate with the chamber 10 of the enclosing cap and the compartment 3 of the receptacle 1.

When the parts are thus assembled, the spring 29 lies under the cap 18 in the channel 21 which is sufficiently large to accommodate the spring and allow of some lateral movement. The cap 18 is provided with two cut out places 30 and 31 through which the extension arms 25' and 26' of the respective shutters 25 and 26 extend to provide a means by which the shutters 25 and 26 may be pressed inwardly against the outwardly urge of the spring 29.

In the edge of the shutter 25 is provided an elongated notch 32 and a corresponding notch 33 in the shutter 26. On either edge of the mid web 24 of the cap 18, comparatively small lugs 34 and 35 are provided which are bent downwardly and engage in the elongated notches 32 and 33 of the respective shutters; which arrangement provides a guiding means to keep the shutters in proper alignment and the perforations in register with the perforations in the enclosing cover.

When the parts are assembled and disposed in the relationship described, the packing ring 5 is disposed upon the receptacle 1, and the enclosing cover positioned upon the packing ring, the clamping ring 13 is screwed down to press the enclosing cover 6 down upon the packing ring and receptacle, thus effectually closing the compartments of the receptacle. Though the perforations in the shutters 25 and 26 register with the perforations 16 and 17 respectively of the enclosing cover, the spring 29 urges the shutters outwardly until the respective perforations are out of register. An operator may press upon either the arm 25' or 26' and by so doing cause the shutter to move inwardly until the perforations therein register with the corresponding perforations in the enclosing cover, and any granular or powdery material contained in the compartment below may be shaken out through the perforations. When the pressure is relieved, the shutter will return outwardly because of the urge of the spring until the perforations are out of register and the receptacle is closed to outer atmospheric influences and to prevent the contents from spilling.

Having thus described the present embodiment of my invention, it is understood that various changes and modifications may be made in the construction and arrangement of the parts without departing from the spirit or sacrificing any of the advantages of the invention as set forth in the appended claims.

What I claim is:

1. A device of the class described, comprising a container having separate compartments, a partition within said container, the upper edge of which is preferably flush with the edge of the container, an enclosing cover, a cap upon said enclosing cover, means for securing the enclosing cover upon said container, means for securing the cap upon said enclosing cover, perforated shutters disposed between said enclosing cover and said cap and adapted to move against the resistance of a U-shaped spring disposed in an annular channel formed in said cap.

2. In a device of the character described, a hollow body having a diametric partition therein dividing said body into two compartments, an enclosing cover, a cap upon said enclosing cover, means for securing the enclosing cover upon the container, means for securing the cap upon the enclosing cover, perforations in said enclosing cover, perforated shutters disposed between said enclosing cover and said cap, a spring disposed beneath the cap in a U-shaped annular channel formed in said cap and adapted to urge the shutters apart, each end of the spring engaging a shutter and secured thereto by means of pressed-up lips on the shutters.

3. In a device of the character described, a hollow body having a diametric partition therein dividing said body into two compartments, the partition and the edges of the body flush, an enclosing cover disposed upon said hollow body and a packing ring adapted to rest upon and cover the edges of the body and the partition and held in place by said enclosing cover to provide means to prevent leakage from one compartment into the other, a cap upon said enclosing cover, perforations in said enclosing cover, perforated shutters disposed between said enclosing cover and said cap, a U-shaped spring disposed beneath the cap in an annular channel formed in said cap, and adapted to urge the shutters apart, each end of the spring engaging a shutter and secured thereto.

CLAUDE G. WATSON.